INVENTORS
FRIEDRICH ERNST HEY, HANS KUIPERS,
VOLKER SCHIEL, ERICH FRIEDL,
GERMUTH VON HOFFMANN,
FRANZ HINTE, EUGEN BRAUN

ATTORNEYS

United States Patent Office 3,416,470
Patented Dec. 17, 1968

3,416,470
METHOD OF CONTROLLING AND/OR REGULATING INDUCED DRAUGHT FANS FOR WASTE HEAT BOILERS
Ernst Friedrich Hey, Mulheim (Ruhr), Hans Kuipers, Wesel Feldmark, Volker Schiel, Rhinehausen, Friedl Erich, Essen, and Germuth von Hoffmann, Franz Hinte, and Eugen Braun, Rhinehausen, Germany, assignors to Deutsche Babcock & Wilcox-Dampfkellel-Werke Aktiengesellschaft, Oberhausen, Rhineland, Germany, a corporation of Germany
Filed Nov. 4, 1965, Ser. No. 506,296
Claims priority, application Germany, Nov. 7, 1964, H 54,240
4 Claims. (Cl. 110—162)

ABSTRACT OF THE DISCLOSURE

Control of a draft fan for waste heat boilers in accordance with the temperature of the fully burned gas and the flow rate of the exiting gas to maintain a predetermined ratio of waste gas volume to waste gas temperature.

Figure 1:
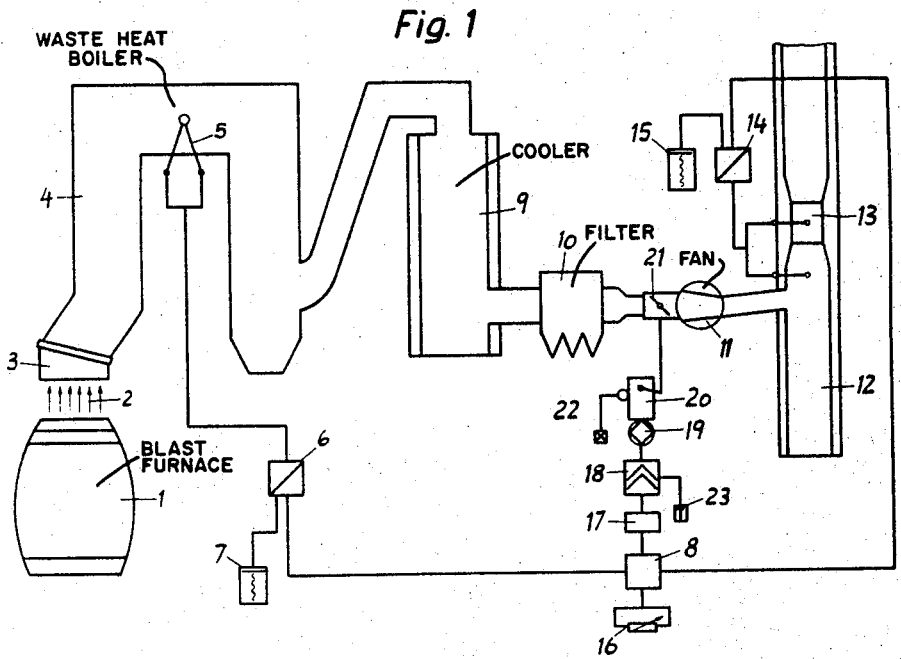

The invention relates to a method of controlling and/or regulating automatically induced draught fans for boilers with quickly changing supply of heat, more particularly waste heat recovery boilers of metallurgical furnaces, e.g. oxygen blown converters blast furance.

Methods of controlling and regulating induced draught fans for waste heat recovery boilers of metallurgical furnaces, e.g. oxygen blown converters blast furnace, are already known; by them it is intended to ensure that the waste gases consisting for the greatest part of carbon monoxide are burnt, for the production of steam, as far as possible completely. This happens by supplying the combustion air through induced draught fans and applying programme control for matching the fan supplied combustion air to the different blast furnace converter gas volumes actually obtained in the course of the oxygen blowing cycle; this means that at every moment of the blowing cycle the combustion air actually required for complete combustion of the converter gases will be supplied under control.

The disadvantage of this method is to be seen in the fact that it is necessary to predetermine, by a programme, the I.D., fan capacity to be controlled. Since the steelmaking heats take a varying course, it will be necessary to operate with an excessive air surplus so as to dominate the increased amounts of carbon monoxide obtained during the time of maximum decarburization.

Another prior art method is to extract the air from the converter throat and the boiler inlet opening for admission through the boiler wall as combustion air. The disadvantages inherent in this method are to be seen in the necessity of providing double control for the F.D. fan and the I.D. fan arranged downstream. The problem of taking the electrical impulse required for control has also not been solved satisfactorily.

A further prior art possibility is given by employing the pressure at the boiler roof and the carbon monoxide or oxygen content of the waste gas as controlled variable for controlling the induced draught fan. But this control is not satisfactory either, because it is not possible to obtain the carbon monoxide or oxygen analysis of the waste gas quickly enough.

In steel works where the steam produced by burning the converter gases cannot be used or can be used only to a limited extent, plants are already operating with controlled extraction of the converter gases which are then not burnt prior to being cleaned. The primary aim of these methods is to clean the converter gases, and it is only a secondary object when a relatively low utilization of the heat or another application of the burnable converter gases is practised. For this method of operation it is, however, not only necessary to achieve a satisfactory tightness between the converter throat and the boiler inlet opening, but also a fast and safe sequence control between the amount of carbon monoxide contained in the waste gas and the capacity of the induced draught fan.

The object of the present invention is to avoid the disadvantages inherent in the prior art methods. This inventive object is achieved by measuring continuously the temperature of the waste gases in the boiler after completion of combustion and converting the measured values in a transducer; simultaneously the differential pressure proportional to the square of the waste gas as velocity is measured continuously in the waste gas stack and converted in a transducer; the two measured values converted are supplied to an I.D. fan capacity controller. As the waste gas temperature constitutes a linear measure of, e.g., the amount of carbon monoxide discharged from a converter, a constant ratio between waste gas volume and waste gas temperature, i.e. a constant air excess, is established.

In order to achieve fast and safe sequence control in every instance, i.e., also when the temperature of the waste gas is rising quickly, and in order to enable a compensation to be made for the deviation from the linear ratio between waste gas volume and waste gas temperature, it is an advantage to correct the control of the I.D. fan capacity by feeding further measured values into the controller, e.g., the temperature gradient or the pressure at any point of the waste gas stack or at the roof of the waste heat recovery boiler.

When automatic operation of the induced draught fan is intended, it will be an advantage to control automatically its capacity by means of a set point for the ratio between the waste gas volume and the waste gas temperature.

Figure 2:
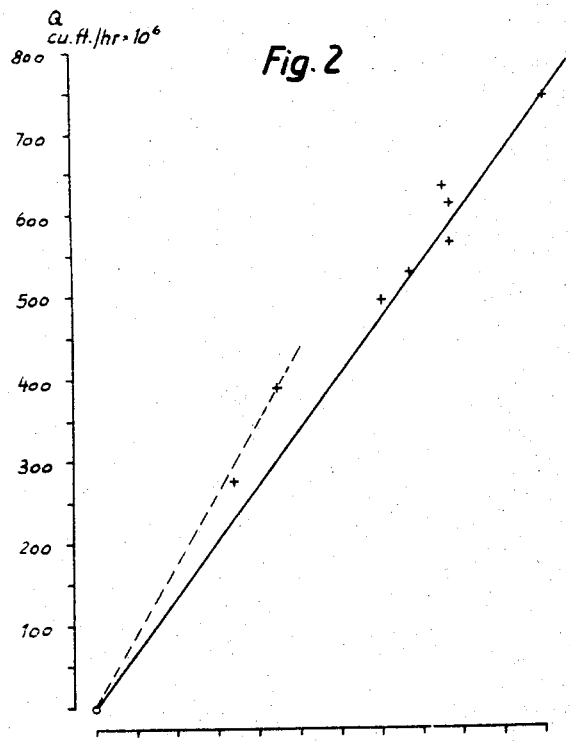

The apparatus employed for realizing the inventive method is shown diagrammatically in FIG. 1 by way of example. FIG. 2 shows the relationship between waste gas temperature and waste gas volume.

By means of an oxygen lance not shown oxygen is blown onto the hot metal bath in converter 1. The converter waste gases produced by the reaction between the oxygen and the carbon of the hot metal pass, as shown by arrows 2, through a hood 3 into a waste heat boiler 4 where the burnable portion of the waste gases, mainly consisting of carbon monoxide, is burnt. At the roof of the waste heat boiler 4, where combustion of the waste gases is completed, the temperature of the burnt waste gases is measured continuously by means of a detecting element, e.g., thermocouple 5, converted in a transducer 6 into a proportional direct current and supplied to controller 8 via temperature recorder 7.

The waste gas burnt is cooled in cooler 9, cleaned in filter 10 and supplied into the waste gas stack 12 through the induced draught fan 11.

By means of a venturi tube 13 the differential pressure proportional to the waste gas velocity is measured continuously in waste gas stack 12 and converted in an evolution type transducer 14 into a proportional direct current which is supplied as a counter-signal to controller 8 via waste gas flow recorder 15. By means of a set point fed into the potentiometer 16 for the ratio between the waste gas volume and the waste gas temperature the capacity of the induced draught fan is controlled through the output signal of controller 8. This output signal of controller 8 passes to a two-stage control amplifier 18 through a proportional plus reset plus rate action controller 17 which allows for quick changes of the rate temperature change $dt/dz$, i.e. temperature changes of the burnt waste gas in the waste heat boiler per unit of time. The rate action of the temperature gradient $dt/dz$ allows a temporary lead of the waste gas volume. The amplified output potential of the control amplifier 18 is admitted to the servomotor 19 which, through servomechanism 20, adjusts the inlet vanes arranged in front of the induced draught fan 11 and thus controls the capacity of the said induced draught fan 11. The actual position of the inlet vanes 21 can be read on an indicator 22 at any time.

With a more or less constant oxygen content of the waste gases, namely approximately 3 percent corresponding to an excess air figure of roughly 1.25, the following values have been determined which, as may be noted upon reference to FIG. 2, show, with a small temperature gradient $dt/dz$, approximately a linear relationship between the waste gas temperature T measured by thermocouple 5 and the waste gas volume Q measured by means of venturi tube 13.

| | | | | | | | | |
|---|---|---|---|---|---|---|---|---|
| Temperature (° F.) | 1,400 | 1,544 | 1,760 | 1,760 | 1,724 | 2,192 | 680 | 896 |
| Waste gas volume ($10^6$ ft.$^3$/hr.) | 494.7 | 530 | 565 | 608 | 636 | 742.5 | 282.5 | 389 |
| Amount of— | | | | | | | | |
| Carbon monoxide (percent) | 0 | 0 | 0.4 | 0 | 0.5 | 0 | 0 | 0 |
| Oxygen (percent) in the waste gas | 4 | 2 | 1 | 2 | 0.4 | 3 | 6 | 4 |
| Temperature rate of change (°F./min.) | 50 | 0 | 0 | 0 | 77 | 0 | 122 | 176 |

In the event of controller 8 failing it is possible to control the capacity of the induced draught fan 11 at any time manually by means of remote control switch 23 and the measured values.

Apart from the described embodiment by which the capacity control of the induced draught fan 11 is used for maintaining as low an air excess as possible for complete combustion of the converter waste gases during the whole blowing cycle, it is also possible to utilize this control, by altering the set point for the ratio between waste gas volume and waste gas temperature, for suppressing the combustion of the converter gases, i.e. for maintaining a constant air deficiency in order to employ the cleaned waste gases for useful purposes.

We claim:
1. In the control of draft fan capacity for waste heat boilers the method comprising continuously measuring the temperature of the fully burned gas in the boiler and converting said temperature to a first electrical signal proportional in strength to said temperature, simultaneously with said temperature measurement continuously measuring indication of the flow rate of said fully combusted gas exiting from said boiler and converting said indication to a second electrical signal that is proportioned to said flow rate, and controlling the capacity of said draft fan in response to a combined electrical signal resulting from the combined effect of said first and second signals to thereby maintain a predetermined ratio of waste gas volume to waste gas temperature.

2. A method according to claim 1 in which the capacity of said draft fan is controlled by said combined signal resulting from maintaining a balance of said first signal being supplied as a counter signal to said second signal.

3. A method according to claim 2 in which said combined signal is defferentiated with respect to time and the resulting controls the capacity of said draft fan to more quickly change draft flow in response to rapid changes in the rate of gas temperature change.

4. A method according to claim 3 in which said first signal is balanced against said second signal at a predetermined balance point to provide a known fuel to air ratio over the entire load range of said boiler.

References Cited
UNITED STATES PATENTS
2,202,793  5/1940  Hagen _____ 110—162
2,252,368  8/1941  Germer _____ 236—14
2,277,493  3/1942  Lane _____ 236—14

JAMES W. WESTHAVER, *Primary Examiner.*

U.S. Cl. X.R.

122—7; 236—15